Patented Feb. 25, 1936

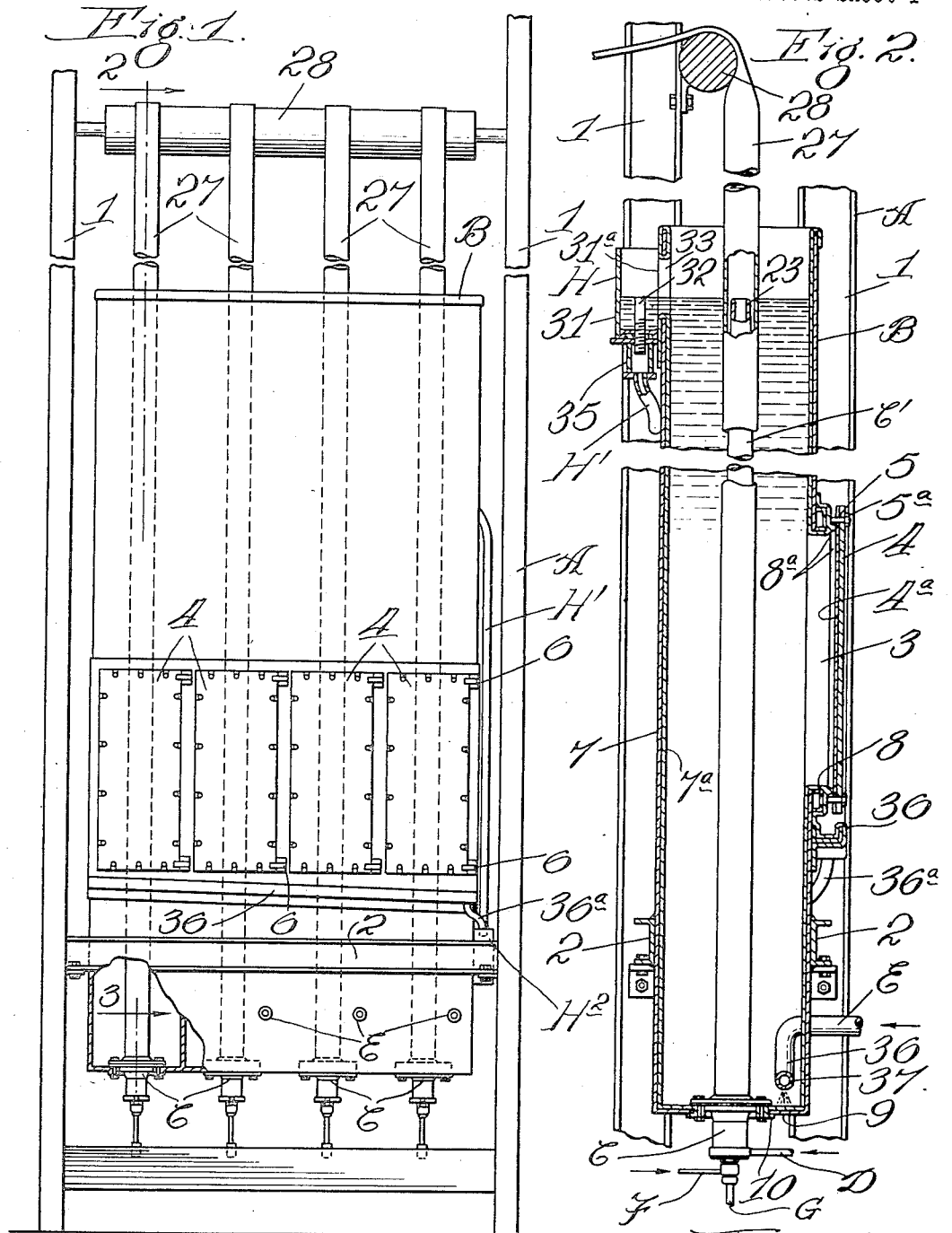

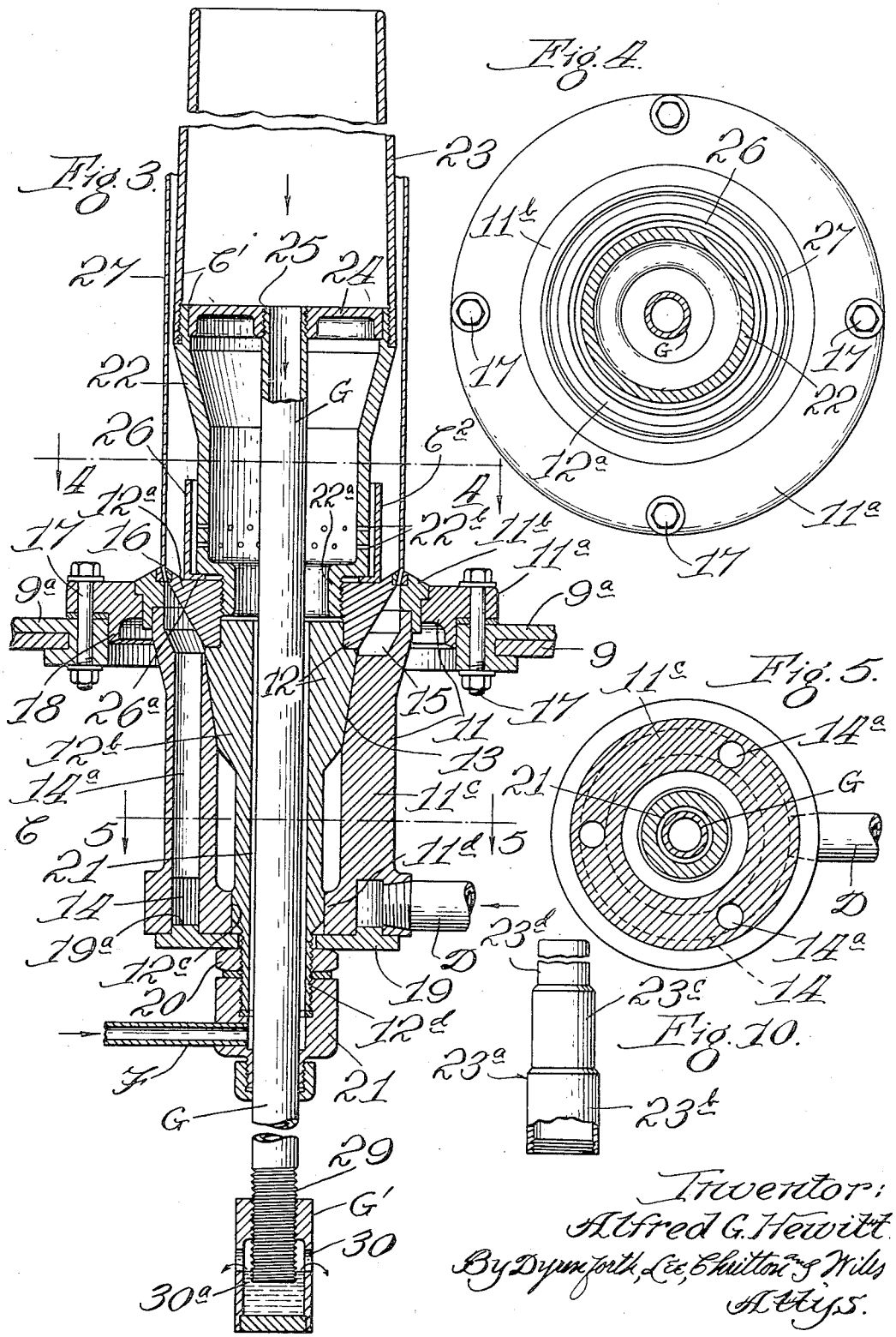

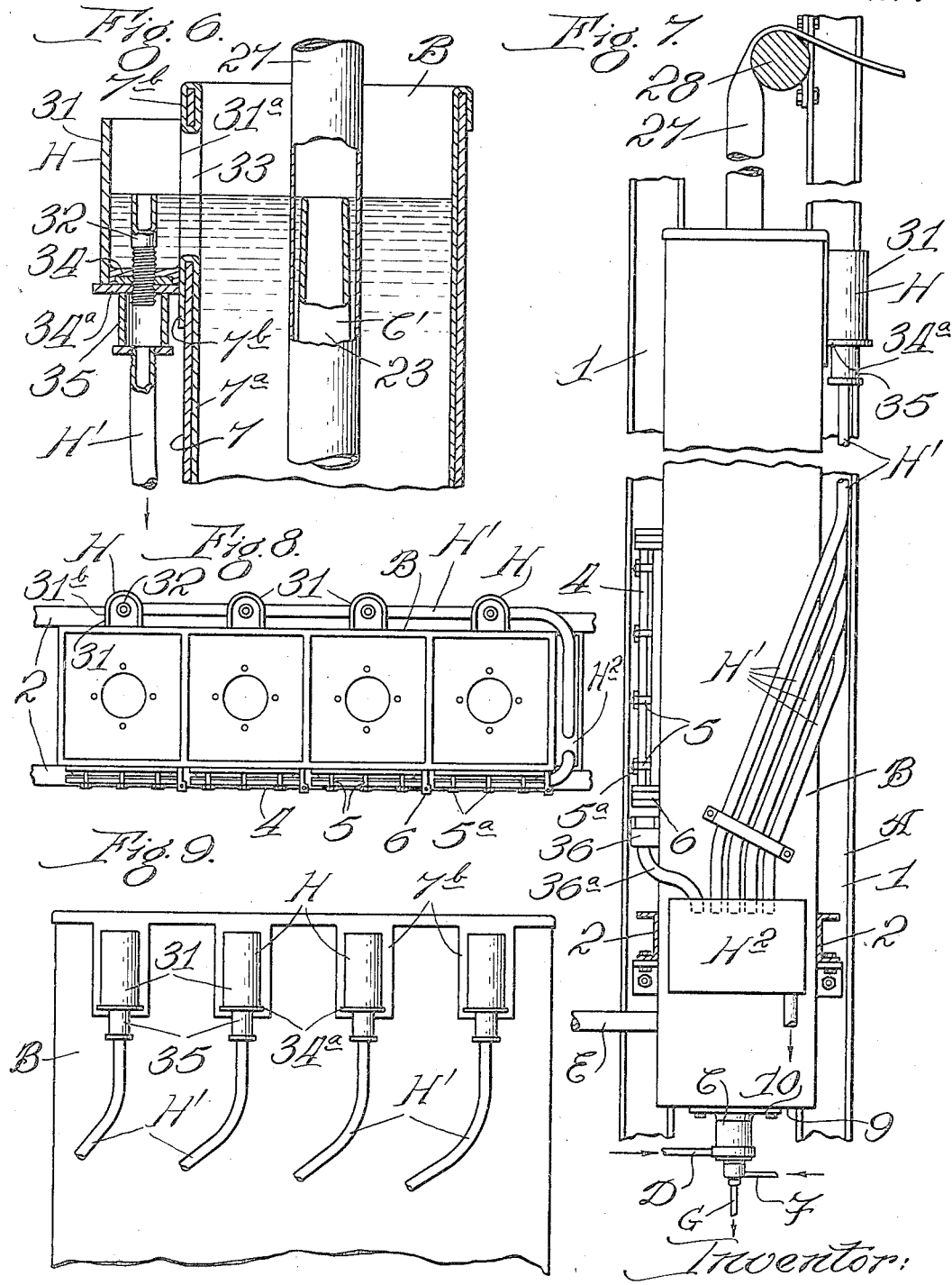

2,032,171

UNITED STATES PATENT OFFICE 2,032,171

EXTRUSION APPARATUS

Alfred G. Hewitt, La Grange, Ill., assignor to The Visking Corporation, Chicago, Ill., a corporation of Virginia Application November 9, 1933, Serial No. 697,339

14 Claims. (Cl. 18—15)

This invention relates particularly to extrusion apparatus adapted to the purpose of manufacturing cellulose tubings, suitable for sausage casings and the like.

The primary object is to provide an improved extrusion device and attendant parts, such as an improved mandrel and baffle for protecting the freshly extruded viscose, for example, against direct impingement of the solution which is injected for the purpose of serving as an internal bath. A further object is to provide an improved overflow device which is properly coordinated with relation to the upper end of the mandrel.

The invention is illustrated, as applied to a battery of tanks, each tank being equipped with its own extrusion device, the arrangement being such that a plurality of casings can be extruded, coagulated and regenerated.

It is well understood in the art at the present time that a viscose solution, after being properly ripened, may be extruded upwardly in tubular form through a coagulating and regenerating bath, after which the cellulose tubing may be passed through a series of baths to complete the regeneration, and subsequently through cleansing baths, and ultimately through a bath containing a considerable percentage of glycerine, or other hygroscopic agent. After such treatment, the tubing may be passed in inflated condition through a drier. After the drying operation, the glycerine contained in the tubing material aids in attracting sufficient moisture to prevent the tubing from becoming brittle.

The present invention is intended to facilitate the manufacture of cellulose tubing, following the general plan of procedure suggested. It may be remarked, however, that the tubing may, if desired, be maintained in inflated condition (by means of the internal gas pressure which develops), throughout the entire course of drawing. That is, flattening of the tubing may be prevented, if desired, until the tubing has become so far regenerated as to be no longer subject to injury from the flattening operation. Another result which follows from maintaining the tubing in inflated condition throughout the entire drawing operation is that any internally developed gases (in excess of the predetermined moderate pressure which is desirably maintained) may be permitted to escape through the drain pipe of the internal bath, which passes centrally downward through the inner member of the extrusion device.

The invention preferably is employed in connection with deep-bath extrusion, where the present improvements find their greatest usefulness.

The invention is illustrated in a preferred embodiment in the accompanying drawings, in which—

Fig. 1 is a front elevational view of extrusion apparatus constructed in accordance with the invention, such apparatus comprising a battery of extrusion tanks, each tank being equipped with its own extrusion device; Fig. 2, a vertical sectional view taken as indicated at line 2 of Fig. 1, the frame which supports the battery of tanks being shown broken; Fig. 3, an enlarged broken vertical sectional view taken as indicated at line 3, Fig. 1, and showing details of the extrusion device employed; Fig. 4, a plan section taken as indicated at line 4 of Fig. 3; Fig. 5, a plan section taken as indicated at line 5 of Fig. 3; Fig. 6, a broken vertical sectional view, taken in the same plane as the section shown in Fig. 2, but on a larger scale; Fig. 7, an end elevational view of the battery of tanks and attendant parts; Fig. 8, a plan view of the battery of tanks; Fig. 9, a broken elevational view showing the overflow device for the external bath, one of these devices being connected with each tank; and Fig. 10, a broken elevational view illustrating the improved mandrel, in modified form.

The apparatus as shown comprises a frame A having uprights 1 and cross-bars 2; a battery of vertical tanks B of practically identical construction, the lower end of the tanks projecting through the space between the cross-bars 2 and securely supported thereon, as indicated in Fig. 2; an extrusion device C applied to the bottom of each tank and preferably equipped with a tubular mandrel C′ which extends upwardly to near the upper end of the tank; a baffle $C^2$ so disposed as to protect the freshly extruded viscose against jets or currents of the internal bath; a viscous-supply pipe D connected with the lower portion of the device C; an external bath supply pipe E (Fig. 2); an internal bath-supply pipe F; a drain-pipe G through which overflow from the internal bath and also internally developed gases may escape, the lower end of said drain-pipe being preferably equipped with a trap G′ which enables a moderate distending pressure to be maintained within the viscose tubing; and an external bath-overflow device H connected with the upper portion of each tank of the battery, the devices H being equipped with drain-pipes H′ which lead to a collecting tank $H^2$.

The frame A may be of any suitable construction. It is desirable that it should be so constructed as to support the tanks in a suitable manner to give access to the lower ends of the tanks and provide sufficient space below the tanks for pipe connections, etc.

The battery of tanks B also may be of any suitable construction. Preferably these tanks are of much greater depth than has commonly been the practice. For example, in former practice in this country a tank of about 16" in depth has ordinarily been employed. While the present improvements may be applied to tanks of any desired depth, it is preferred to employ tanks of about 48" in depth for the larger and heavier viscose tubes, for example, tubes of 4" or 4½" in diameter, and to employ a tank of much greater depth for smaller and thinner tubes, for example tubes ranging in diameter from ¾ of an inch to 1½". By the use of proper expedients, it is thus possible to greatly increase the extruding and drawing speed of the tubings. Where deep extrusion tanks are employed, it is preferred to provide the tanks with openings 3 at a considerable distance from the bottom of the tanks, these openings being securely closed by doors 4 which are clampingly secured against their seats as by means of bolts 5 equipped with nuts $5^a$. In Fig. 1, the nuts are omitted, the doors being shown swung to the closed position upon hinges 6. Each tank may have a vertical series of doors, if desired.

Preferably the tanks are made of sheet steel, as indicated at 7, and provided with lead linings, as indicated at $7^a$, this detail being shown in Fig. 2. In the illustration given, the lead lining is extended through the opening 3 and reflected over a frame-member 8. A bead of lead $8^a$ serves as a seat for the door 4, the door being also lined with a lead sheet $4^a$. The bottom wall of the tank is designated 9. This wall is provided with a central opening through which the extrusion device C extends. Preferably, the lead lining covers the bottom of the tank, also, and this bottom lining is provided with a lead ring or bushing 10 which protects the margin of the central opening, as shown in Fig. 2.

Fig. 3 shows a slight modification in this respect, the lead lining at the bottom being designated $9^a$.

Preferably, the extrusion device C is constructed as illustrated in Fig. 3, this construction providing for self-centering of the inner member of the extrusion device with relation to the outer member thereof. As shown, the extrusion device comprises an outer extrusion member generally designated 11, and an inner extrusion member generally designated 12. The outer extrusion-member 11 is shown as comprising a supporting ring $11^a$; an outer orifice-member $11^b$ carried by the ring $11^a$; and a depending cylindrical member $11^c$ carried by the member $11^b$.

The inner extrusion member 12 is shown as comprising an orifice-member $12^a$, and a tubular core $12^b$ depending therefrom. The members $12^a$ and $12^b$ may be understood to be securely connected together by a force-fit connection. Likewise, the members $11^a$ and $11^b$ and the members $11^b$ and $11^c$ may be understood to be securely connected together by force-fit connections. Thus, the member 11 virtually is of integral construction; also, the member 12 virtually is of integral construction.

The cylindrical member $11^c$ and the core-member $12^b$ are provided with co-acting taper-surfaces, as indicated at 13, so that these parts are nicely centered with relation to each other and are rendered fluid-tight at the downwardly tapering joint shown.

The outer cylindrical member $11^c$ is provided at its base portion with an annular passage 14, with which the viscose-supply pipe D communicates. The member $11^c$ is provided with vertical passages $14^a$ which serve to conduct the viscose to an annular chamber 15 located just beneath the extrusion-orifice indicated at 16. The annular chamber 15 tapers upwardly and terminates in the thin, slot-like annular orifice 16.

The supporting ring $11^a$ which rests upon the inner surface of the bottom wall 9 is secured to the bottom wall by means of bolts 17. An annular flange 18 with which the ring $11^a$ is provided engages the circular wall of the central opening in the bottom of the tank. The member $12^b$ has near its lower end a circumferential bearing $12^c$ which fits within an encircling bearing $11^d$ with which the member $11^c$ is provided at its lower end. The member $12^b$ has a reduced threaded extension $12^d$ which projects through a central opening in a bottom plate 19 with which the extrusion device is equipped. This bottom plate is provided on its upper surface with a circular flange $19^a$ which serves as a closure for the lower portion of the annular passage 14. The extension $12^d$ is threaded and equipped with a nut 20 which serves to clamp the plate 19 in position. A cup 21 having an interiorly threaded upper end is also secured to the threaded end of the extension $12^d$.

The internal bath supply pipe F extends through a lateral wall of the member 21 and feeds a coagulating and regenerating solution to a central passage $21^a$ which extends upwardly between the drain-pipe G and the inner member $12^b$ of the extrusion device.

The base portion of the mandrel C' is designated 22. It has a reduced, threaded lower end $22^a$ which is screwed into the internally threaded member $12^a$. The member 22 is provided with spray openings $22^b$. The main body of the mandrel is designated 23. Preferably, the outer wall of the mandrel has a slight upward taper. The lower end of the member 23 has screw connection with the member 22. The member 22 is shown provided at its upper end with a plate-like plug 24, which has screw connection with the upper end of the drain-pipe G as indicated at 25.

The baffle $C^2$ is shown as comprising a cylindrical member 26 having at its lower end an inturned flange $26^a$ which is clamped between the member $12^a$ and the lower portion of the member 22.

The viscose tubing rising from the orifice 16 is designated 27. In practice, it is desired that the viscose tubing should avoid contact with the mandrel as far as possible. In fact, it is best to so regulate the operation as to keep the viscose casing quite free from contact with the mandrel.

The upward taper of the mandrel tends to aid in the accomplishment of this purpose; also, the upward taper of the mandrel facilitates the elevation of the leading end of the viscose casing upwardly through the tank and about a supporting element. In the illustration given, the tubing 27 is shown passing over a supporting roller 28, from whence it may pass to a series of subsequent baths.

The lower end of the drain pipe G preferably is equipped with a trap, such as the trap G'. In the form shown, this trap comprises simply a cup having its upper end provided with an internal thread which engages a thread 29 on the lower end of the drain pipe. The cup is provided with lateral openings 30 through which liquid and gas may escape. It will be understood that the coagulating and regenerating solution collects in the bottom of the cup, as indicated at 30a, and overflows through the openings 30. The lower end of the drain pipe extends into the liquid in the cup. By a proper adjustment of the cup with relation to the lower end of the drain pipe, the internal gas pressure within the viscose tubing may be regulated.

It is preferred to employ a coagulating and regenerating bath which possesses a much higher acidity than has ordinarily been employed. The purpose is to complete the regeneration of the tubing as far as possible before it leaves the extrusion bath. This enables the gases generated within the tubing to escape through the drain pipe G. If it be desired to carry the cellulose tubing in inflated condition through the succeeding baths, this may be accomplished by proper apparatus, and thus the tubing may be maintained in proper condition to permit the gases to escape rearwardly through the internal bath drain pipe G. The tubing will be carried in inflated condition until the regeneration, or conversion to cellulose, has been fully accomplished. Thereafter, flattening of the tubing will not cause injury to the tubing or inconvenience in operation. Where the practice here suggested is followed, it becomes unnecessary to resort to slitting the cellulose casing at intervals to permit escape of gases.

It will be understood that viscose is supplied under pressure through the pipe D. This may be accomplished by a suitable pressure device, or by a positive measuring and feeding device. It may be stated, also, that in beginning the extrusion process, the appropriate door 4 may be opened, thus permitting the operator to reach to the bottom of the tank and free the ring of viscose from the lips of the extruding device. By careful manipulation, the operator can draw the tubing through the bath in the lower portion of the tank, and finally upwardly through the tank to the supporting roller 28. The door may then be clamped in position and the injection of bath solution continued until the tank is filled to the proper level. This order of procedure may be varied.

The upper end of the mandrel C' determines the depth of the internal bath, as will be understood from Fig. 2. This level should correspond approximately with the level of the external bath. The overflow devices H with which the tanks are equipped enable the level of the external bath to be nicely and easily regulated. Each device H comprises (Figs. 6–9) an overflow cup 31 which is attached to one side of the tank B near the upper end of the tank, and an overflow tube 32 adjustably mounted in the bottom of the cup. The cup preferably has an open upper end and has one side open, or cut away, as indicated at 31a, this open side being in registration with an opening 33 in the wall of the tank. In the illustration given in Fig. 6, the lead lining 7a is carried through the opening 33 and reflected over the outer surface of the sheet metal wall 7, thus providing the lead surfaces indicated at 7b. The cup 31 preferably is of lead and has the inner edges of its walls 31b burned or fused to the lead covering 7b.

The tube 32 has screw connection with the bottom wall of the cup. This bottom wall is shown as comprising a small Monel metal plate 34 which is embedded in the leaden bottom 34a of the cup. The tube 32 preferably is of Monel metal and has its lower end extending into a smaller lead cup 35 which is fused to the leaden bottom 34a. The drain pipe H' is connected with the bottom of the small cup 35. The arrangement enables the overflow tube 32 to be adjusted by reaching downwardly with the thumb and finger through the open upper end of the cup 31.

As shown in Figs. 1, 2 and 7, a drain trough 36 is arranged below the doors 4, and a drain tube 36a leads from the lower end of this trough to the tank H2 which receives the overflow solution.

In lieu of the mandrel-member 23, one may substitute the mandrel-member 23a shown in Fig. 10. The mandrel-member 23a has a relatively large base-portion 23b and above this a somewhat reduced base-portion 23c. The remaining portion 23d of the tube may be of uniform external diameter. The parts 23b and 23c may be a few inches in length, while the part 23d may be one foot or several feet in length, if desired.

The viscose solution which is introduced through the pipe D is in the form of a rather thin plastic. It will be understood that any suitable plastic, adapted to the purpose of producing seamless tubing in an analogous manner, may be employed.

The pipe E preferably is provided inside the tank with a down-turned portion 36 having horizontal flanges 37 provided at their lower sides with small discharge openings. The ends of the branch-pipes 37 are plugged. The purpose is to prevent injury to the viscose tube.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. An extrusion-device comprising: outer and inner extrusion-members having an annular chamber and an extrusion-orifice between their upper end-portions and having coacting smooth, tapering centering surfaces below said chamber; means for forcing said surfaces into close-fitting relation and securing said extrusion-members together; a plastic supply-pipe connected with the lower end-portion of said device; and means of communication between said pipe and said chamber.

2. A device as specified in claim 1, in combination with an extrusion-tank having an opening through its bottom through which the extrusion-device extends, the outer extrusion-member being secured to said bottom.

3. An extrusion-device as specified in claim 1, in which said centering surfaces are frusto-conical surfaces having a downwardly converging taper.

4. Extrusion-apparatus comprising: outer and inner extrusion-members, having coacting conical surfaces near their upper ends, a plastic-chamber above said conical surfaces, and an annular extrusion-orifice at the upper end of said chamber, the inner extrusion-member having a threaded extension extending below the outer member; a mandrel surmounting and secured to the inner extrusion-member; a wall forming a closure near the lower end of said mandrel; a drain-pipe secured to said wall and communicating with the interior of the mandrel above said wall, said drain-pipe depending through the inner extrusion-member; and a clamping nut on said threaded extension.

5. Extrusion apparatus as specified in claim 4, in which the outer extrusion-member is provided at its lower end with an annular chamber communicating with a passage leading through the outer extrusion-member to said plastic-chamber and a bottom-plate is provided which forms a closure for said annular chamber.

6. Extrusion apparatus as specified in claim 4, in which the inner extrusion-member has its lower end-portion provided with a bearing which fits within a bore in the lower end-portion of the outer extrusion-member, the outer extrusion-member having an annular chamber in its lower portion communicating with an inlet-pipe; and a bottom plate forming a closure for said annular chamber and having a perforation through which said threaded extension projects, the clamping-nut on said threaded extension serving to draw the extrusion members together and secure said plate in position.

7. Extrusion apparatus as specified in claim 4, in which a trap is secured to the lower end of said drain-pipe, said trap having an overflow-orifice disposed above the lower end of the drain-pipe.

8. In extrusion apparatus: an extrusion-tank having an opening in its bottom; a supporting ring mounted in said tank on said bottom and having a flange depending into said opening; an outer extrusion-member supported by said ring and equipped at its upper end with an orifice-member, provided at its lower end with an annular passage, and provided intermediately with a frusto-conical inner surface; an inner extrusion-member equipped at its upper end with an orifice-member and at its lower end with a circumferential bearing disposed in a bore at the lower end of the outer extrusion-member, said inner member having a depending threaded extension and having near its upper portion an external frusto-conical surface coacting with said first-mentioned frusto-conical surface, said extrusion-members having between their upper portions a plastic-chamber, and said outer extrusion-member having a passage forming a communication between said plastic-chamber and said annular passage; a bottom plate forming a closure for said annular passage and having a central perforation through which said threaded extension depends; and a clamping-nut on said threaded extension securing said plate in position.

9. In extrusion apparatus: an extrusion-tank adapted to contain a coagulating solution; an extrusion-device extending through the bottom of said tank and having an inner extrusion-member and an outer extrusion-member forming an upwardly presented annular extrusion-orifice; and a mandrel mounted on the inner extrusion-member, said mandrel being of relatively large diameter near its base and of reduced diameter above the portion which is of relatively large diameter.

10. In extrusion apparatus: an extrusion-tank adapted to contain a coagulating solution; an extrusion-device extending through the bottom of said tank and having an inner extrusion-member and an outer extrusion-member forming an upwardly presented annular extrusion-orifice; and a mandrel mounted on the inner extrusion-member, said mandrel being of relatively large diameter near its base and tapering upwardly smoothly from the portion which is of relatively large diameter.

11. In extrusion apparatus: a tank having mounted in its bottom an extrusion-device comprising an outer extrusion-member and an inner extrusion-member having between their upper ends an annular extrusion-orifice opening upwardly into the tank; a mandrel comprising a mandrel-base equipped with a plug and a tubular mandrel rising from said base; a drain-pipe having its upper end connected with said plug and communicating with the mandrel above the plug, said mandrel depending through the inner extrusion-member and said inner extrusion-member having a threaded extension depending below the outer extrusion-member; and a clamping-nut on said threaded extension.

12. In extrusion apparatus: an extrusion-tank; an extrusion device connected with the bottom of said tank comprising an outer extrusion-member and an inner extrusion-member; a mandrel supported on the inner extrusion-member, said mandrel having its base-portion provided with outlets through which an internal bath may be sprayed; means for supplying an internal bath within the lower portion of the mandrel and causing the same to be sprayed through said outlets; and a baffle encircling the lower end-portion of the mandrel to prevent direct impingement of the issuing fluid against the freshly extruded tubing.

13. Apparatus as specified in claim 12, in which the mandrel has its extreme lower portion of reduced diameter, said baffle being disposed between said reduced portion and an imaginary cylinder rising from the extrusion-orifice.

14. In extrusion apparatus: an extrusion tank adapted to contain a coagulating solution; an extrusion device extending through the bottom of said tank and having an inner extrusion-member and an outer extrusion-member forming an upwardly presented annular extrusion-orifice; and a mandrel mounted on the inner extrusion member, said mandrel having an enlarged base-portion provided with stepped surfaces, progressively reducing the diameter in an upward direction.

ALFRED G. HEWITT.